(12) United States Patent
Kahn et al.

(10) Patent No.: US 7,548,624 B2
(45) Date of Patent: Jun. 16, 2009

(54) DISTRIBUTION OF BROADCAST CONTENT FOR REMOTE DECRYPTION AND VIEWING

(75) Inventors: Raynold M. Kahn, Los Angeles, CA (US); Ronald P. Cocchi, Seal Beach, CA (US); Gregory J. Gagnon, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 673 days.

(21) Appl. No.: 10/758,818

(22) Filed: Jan. 16, 2004

(65) Prior Publication Data

US 2007/0258596 A1 Nov. 8, 2007

(51) Int. Cl.
*H04L 9/00* (2006.01)

(52) U.S. Cl. .............. 380/284; 380/240; 380/242; 380/239; 380/212; 380/281; 726/27; 726/29; 713/176; 713/193

(58) Field of Classification Search .......... 380/284, 380/212, 242, 240, 281, 239; 726/27, 29; 713/176, 193
See application file for complete search history.

(56) References Cited

U.S. PATENT DOCUMENTS

| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |
| 4,866,787 A | 9/1989 | Olesen |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan |
| 5,301,245 A | 4/1994 | Endoh |
| 5,301,352 A | 4/1994 | Nakagawa et al. |
| 5,335,277 A | 8/1994 | Harvey et al. |
| 5,357,276 A | 10/1994 | Banker et al. |

(Continued)

FOREIGN PATENT DOCUMENTS

EP 0677949 10/1995

(Continued)

OTHER PUBLICATIONS

Koga, Keiichiro. Security for Information Data Broadcasting System with Conditional-Access Control. IEEE: 1995.*

(Continued)

*Primary Examiner*—Kambiz Zand
*Assistant Examiner*—Kari L Schmidt

(57) ABSTRACT

Program materials received from a direct broadcast satellite system are distributed between a host receiver and a client receiver for remote decryption. Using either a same pairing key or different host and client pairing keys, an encrypted media encryption key is received at both the host and client receivers, and the encrypted media encryption key is decrypted at both the host and client receivers using the pairing key. Encrypted program materials are received from the broadcast system at the host receiver, and the encrypted program materials are decrypted at the host receiver using the media encryption key. The encrypted program materials are also transferred from the host receiver to the client receiver, where the encrypted program materials are decrypted at the client receiver using the media encryption key.

48 Claims, 8 Drawing Sheets

U.S. PATENT DOCUMENTS

| | | |
|---|---|---|
| 5,371,551 A | 12/1994 | Logan et al. |
| 5,386,587 A | 1/1995 | Yuzawa |
| 5,396,293 A | 3/1995 | Shellard |
| 5,421,031 A | 5/1995 | De Bey |
| 5,438,423 A | 8/1995 | Lynch et al. |
| 5,440,336 A | 8/1995 | Buhro et al. |
| 5,481,609 A | 1/1996 | Cohen et al. |
| 5,495,531 A | 2/1996 | Smiedt |
| 5,506,902 A | 4/1996 | Kubota |
| 5,557,541 A | 9/1996 | Schulhof et al. |
| 5,565,805 A | 10/1996 | Nakagawa et al. |
| 5,583,937 A | 12/1996 | Ullrich et al. |
| 5,586,264 A | 12/1996 | Belknap et al. |
| 5,592,551 A | 1/1997 | Lett et al. |
| 5,592,651 A | 1/1997 | Rackman |
| 5,594,491 A | 1/1997 | Hodge et al. |
| 5,619,247 A | 4/1997 | Russo |
| 5,640,453 A | 6/1997 | Schuchman et al. |
| 5,642,418 A | 6/1997 | Farris et al. |
| 5,663,896 A | 9/1997 | Aucsmith |
| 5,675,390 A | 10/1997 | Schindler et al. |
| 5,677,895 A | 10/1997 | Mankovitz |
| 5,701,383 A | 12/1997 | Russo et al. |
| 5,701,582 A | 12/1997 | De Bey |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,280 A | 3/1998 | Inoue et al. |
| 5,734,853 A | 3/1998 | Hendricks et al. |
| 5,748,732 A | 5/1998 | Le Berre et al. |
| 5,761,302 A | 6/1998 | Park |
| 5,764,762 A | 6/1998 | Kazmierczak et al. |
| 5,784,095 A | 7/1998 | Robbins et al. |
| 5,790,663 A | 8/1998 | Lee et al. |
| 5,790,783 A | 8/1998 | Lee et al. |
| 5,793,971 A | 8/1998 | Fujita et al. |
| 5,805,699 A | 9/1998 | Akiyama et al. |
| 5,826,165 A | 10/1998 | Echeita et al. |
| 5,831,664 A | 11/1998 | Wharton et al. |
| 5,845,240 A | 12/1998 | Fielder |
| 5,848,158 A | 12/1998 | Saito et al. |
| 5,850,218 A | 12/1998 | LaJoie et al. |
| 5,864,747 A | 1/1999 | Clark et al. |
| 5,867,207 A | 2/1999 | Chaney et al. |
| 5,899,582 A | 5/1999 | DuLac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,933,500 A | 8/1999 | Blatter et al. |
| 5,936,660 A | 8/1999 | Gurantz |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Erlin |
| 5,978,649 A | 11/1999 | Kahn |
| 5,999,628 A | 12/1999 | Chan |
| 5,999,629 A | 12/1999 | Heer et al. |
| 6,005,937 A | 12/1999 | Lee |
| 6,011,511 A | 1/2000 | Chuong et al. |
| 6,025,868 A | 2/2000 | Russo |
| 6,055,314 A | 4/2000 | Spies et al. |
| 6,055,566 A | 4/2000 | Kikinis |
| 6,061,451 A | 5/2000 | Muratani et al. |
| 6,061,452 A | 5/2000 | Suzuki |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,105,134 A | 8/2000 | Pinder et al. |
| 6,144,400 A | 11/2000 | Ebisawa |
| 6,148,081 A | 11/2000 | Szymanski et al. |
| 6,154,206 A | 11/2000 | Ludtke |
| 6,157,719 A | 12/2000 | Wasilewski et al. |
| 6,157,949 A | 12/2000 | Cheng et al. |
| 6,169,879 B1 | 1/2001 | Perlman |
| 6,202,211 B1 | 3/2001 | Williams, Jr. |
| 6,229,895 B1 | 5/2001 | Son et al. |
| 6,240,401 B1 | 5/2001 | Oren et al. |
| 6,263,504 B1 | 7/2001 | Ebisawa |
| 6,266,481 B1 | 7/2001 | Lee et al. |
| 6,286,142 B1 | 9/2001 | Ehreth |
| 6,288,716 B1 | 9/2001 | Humpleman et al. |
| 6,289,455 B1 | 9/2001 | Kocher et al. |
| 6,317,883 B2 | 11/2001 | Marics |
| 6,317,884 B1 | 11/2001 | Eames et al. |
| 6,370,688 B1 | 4/2002 | Hejna, Jr. |
| 6,381,747 B1 | 4/2002 | Wonfor et al. |
| 6,398,245 B1 | 6/2002 | Gruse et al. |
| 6,405,372 B1 | 6/2002 | Kim et al. |
| 6,415,031 B1 | 7/2002 | Colligan et al. |
| 6,437,836 B1 | 8/2002 | Huang et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,476,825 B1 | 11/2002 | Croy et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,510,519 B2 | 1/2003 | Wasilewski et al. |
| 6,516,465 B1 | 2/2003 | Paskins |
| 6,519,693 B1 | 2/2003 | De Bey |
| 6,519,772 B1 | 2/2003 | Bopardikar |
| 6,530,085 B1 | 3/2003 | Perlman |
| 6,542,870 B1 | 4/2003 | Matsumoto |
| 6,550,011 B1 | 4/2003 | Sims, III |
| 6,560,340 B1 | 5/2003 | Akins et al. |
| 6,574,609 B1 * | 6/2003 | Downs et al. ............... 705/50 |
| 6,588,017 B1 * | 7/2003 | Calderone ................. 725/120 |
| 6,611,812 B2 | 8/2003 | Hurtado et al. |
| 6,637,027 B1 | 10/2003 | Breslauer et al. |
| 6,654,547 B1 | 11/2003 | Maeda et al. |
| 6,655,580 B1 | 12/2003 | Ergo et al. |
| 6,681,326 B2 | 1/2004 | Son et al. |
| 6,697,489 B1 | 2/2004 | Candelore |
| 6,741,834 B1 | 5/2004 | Godwin |
| 6,745,245 B1 | 6/2004 | Carpenter |
| 6,748,080 B2 | 6/2004 | Russ et al. |
| 6,772,434 B1 | 8/2004 | Godwin |
| 6,804,357 B1 | 10/2004 | Ikonen et al. |
| 6,853,728 B1 | 2/2005 | Kahn et al. |
| 6,889,208 B1 * | 5/2005 | Okabe et al. ................ 705/57 |
| 6,904,522 B1 | 6/2005 | Benardeau et al. |
| 6,934,963 B1 | 8/2005 | Reynolds et al. |
| 6,961,858 B2 * | 11/2005 | Fransdonk ................. 726/29 |
| 6,993,499 B2 | 1/2006 | Gagnon et al. |
| 7,035,827 B2 * | 4/2006 | Ezaki ......................... 705/51 |
| 7,093,295 B1 | 8/2006 | Saito |
| 7,177,911 B2 * | 2/2007 | deCarmo ................... 709/209 |
| 7,191,155 B2 | 3/2007 | Maruyama et al. |
| 7,191,335 B1 * | 3/2007 | Maillard ..................... 713/176 |
| 7,228,439 B2 | 6/2007 | Sasselli |
| 7,406,618 B2 * | 7/2008 | Van Rijnsoever et al. ... 380/239 |
| 2001/0001876 A1 | 5/2001 | Morgan et al. |
| 2001/0017920 A1 * | 8/2001 | Son et al. .................... 380/212 |
| 2001/0046299 A1 | 11/2001 | Wasilewski et al. |
| 2001/0053979 A1 | 12/2001 | Kori |

| | | | |
|---|---|---|---|
| 2002/0001386 A1* | 1/2002 | Akiyama | 380/201 |
| 2002/0021805 A1 | 2/2002 | Schumann et al. | |
| 2002/0023219 A1 | 2/2002 | Treffers et al. | |
| 2002/0048367 A1 | 4/2002 | Maillard | |
| 2002/0056112 A1 | 5/2002 | Dureau et al. | |
| 2002/0094084 A1* | 7/2002 | Wasilewski et al. | 380/241 |
| 2002/0101991 A1 | 8/2002 | Bacon et al. | |
| 2002/0112243 A1 | 8/2002 | Hunter et al. | |
| 2002/0116705 A1 | 8/2002 | Perlman et al. | |
| 2002/0162104 A1* | 10/2002 | Raike et al. | 725/31 |
| 2002/0170054 A1 | 11/2002 | Kudelski et al. | |
| 2002/0170072 A1 | 11/2002 | Lundblad et al. | |
| 2002/0196374 A1 | 12/2002 | Barry et al. | |
| 2003/0026428 A1* | 2/2003 | Loisel | 380/277 |
| 2003/0040962 A1 | 2/2003 | Lewis | |
| 2003/0061477 A1 | 3/2003 | Kahn et al. | |
| 2003/0097622 A1* | 5/2003 | Liu et al. | 714/704 |
| 2003/0105718 A1 | 6/2003 | Hurtado et al. | |
| 2003/0110132 A1 | 6/2003 | Sako | |
| 2003/0145183 A1 | 7/2003 | Muehring | |
| 2003/0174844 A1 | 9/2003 | Candelore | |
| 2003/0196113 A1 | 10/2003 | Brown et al. | |
| 2003/0208771 A1 | 11/2003 | Hensgen et al. | |
| 2003/0228911 A1 | 12/2003 | Dernis et al. | |
| 2004/0068747 A1* | 4/2004 | Robertson et al. | 725/98 |
| 2005/0050333 A1 | 3/2005 | Yeap et al. | |
| 2005/0144248 A1* | 6/2005 | Doganowski et al. | 709/208 |
| 2005/0235361 A1 | 10/2005 | Alkove et al. | |
| 2006/0168663 A1* | 7/2006 | Viljoen et al. | 726/27 |
| 2006/0179489 A1* | 8/2006 | Mas Ribes | 726/27 |

FOREIGN PATENT DOCUMENTS

| | | |
|---|---|---|
| EP | 710017 A2 | 5/1996 |
| EP | 0936812 A1 | 8/1999 |
| EP | 0 975165 A2 | 1/2000 |
| EP | 0975165 | 1/2000 |
| EP | 0989557 | 3/2000 |
| EP | 0989557 A1 | 3/2000 |
| EP | 1122910 A1 | 8/2001 |
| EP | 1156676 A2 | 11/2001 |
| EP | 1304871 A2 | 4/2003 |
| EP | 1369152 A2 | 12/2003 |
| GB | 2272822 | 5/1994 |
| GB | 2354392 | 3/2001 |
| JP | 06351023 A | 12/1994 |
| JP | 8287014 | 11/1996 |
| JP | 11136708 A | 5/1999 |
| JP | 2000122933 A | 4/2000 |
| WO | WO 92/11713 | 7/1992 |
| WO | 9907150 A1 | 2/1999 |
| WO | 9909743 | 2/1999 |
| WO | WO 99/18729 | 4/1999 |
| WO | 0008909 A2 | 2/2000 |
| WO | WO 00/13412 | 3/2000 |
| WO | WO 00/14967 | 3/2000 |
| WO | WO 00/19294 | 4/2000 |
| WO | WO 01/22724 | 3/2001 |
| WO | WO 01/37546 | 5/2001 |
| WO | WO 01/43444 A2 | 6/2001 |
| WO | WO 01/65762 | 9/2001 |
| WO | WO 01/99422 | 12/2001 |
| WO | WO 02/15184 A1 | 2/2002 |
| WO | WO 02/065720 A2 | 8/2002 |

OTHER PUBLICATIONS

EBU Project Group B/CA. Functional Model of a conditional access system. EBU Technical Review: Jun. 10, 1995.*
Anerousis, N., *SkyCast: The Satellite Digital Broadcast Relay Service*, AT&T Labs Research, unpublished manuscript, 1999, pp. 1-4.
"PKCS #1 v2.1: RSA Cryptography Standard"; Jun. 14, 2002; RSA Laboratories; 61 pages.
Ma, Huadong; Shin, Kang G.; "Multicast Video on Demand Services"; ACM SIGCOMM Computer Communication Review; vol. 32, Issue 1; Jan. 2002; pp. 31-43; ACM Press; New York, New York.
Tantaoui, Mounir A., Hua, Kien A., Sheu, Simon; "Interaction with Broadcast Video"; International Multimedia Conference Proceedings of the 10$^{th}$ ACM International Conference; pp. 29-38; ACM Press; New York, New York; 2002; ISBN: 1-58113-620-X.
Griwodz, Carsten; Merkel, Oliver; Dittmann, Jana; Steinmetz, Ralf; "Protecting Vo D The Easier Way" ; International Multimedia Conference Proceedings of the 6$^{th}$ ACM International Conference on Multimedia; pp. 21-28; ACM Press; New York, New York; 2002; ISBN: 0-201-30990-4.
Non-final Office Action dated Jan. 18, 2008 in U.S. Appl. No. 10/759,679, filed Jan. 19, 2004 by Arsenault et al.
Notice of Allowance dated Dec. 5, 2007 in U.S. Appl. No. 09/620,833, filed Jul. 21, 2000 by Kahn et al.
Notice of Allowance dated Dec. 10, 2007 in U.S. Appl. No. 09/960,824, filed Sep. 21, 2001 by Kahn et al.
Non-final Office Action dated Dec. 4, 2007 in U.S. Appl. No. 10/758,811, filed Jan. 16, 2004 by Kahn et al.
Final Office Action dated Jan. 23, 2008 in U.S. Appl. No. 09/620,772, filed Jul. 21, 2000 by Kahn et al.
EPO Communication dated Mar. 6, 2008 in European counterpart Application No. 05250222.6 of U.S. Appl. No. 10/758,856, filed Jan. 16, 2004 by Raynold M. Kahn et al.
Notice of Allowance dated Dec. 23, 2008 in U.S. Appl. No. 10/758,865, filed Jan. 16, 2004 by Raynold M. Kahn et al.
EPO Communication dated Nov. 20, 2008 in European patent Application No. 05250222.6 filed Jan. 17, 2005 by Raynold Kahn et al.
EPO Communication dated Nov. 6, 2008 in European patent Application No. 05250223.4 filed Jan. 17, 2005 by Raynold Kahn et al.
U.S. Appl. No. 10/758,865, filed Jan. 16, 2004, Raynold M. Kahn, Non-final Office action dated Sep. 25, 2007.
U.S Appl. No. 10/790,466, filed Mar. 1, 2004, Stephen P. Dulac, Final Rejection dated Oct. 10, 2007.
Final Rejection dated Feb. 27, 2009 in U.S. Appl. No. 10/758,811 filed Jan. 16, 2004 by Raynold M. Kahn.

* cited by examiner

DISTRIBUTION OF BROADCAST CONTENT FOR REMOTE DECRYPTION AND VIEWING

CROSS-REFERENCE TO RELATED APPLICATIONS

This application is related to the following co-pending and commonly-assigned patent applications, all of which applications are incorporated by reference herein:

U.S. patent application Ser. No. 09/620,832, entitled "VIDEO ON DEMAND PAY PER VIEW SERVICES WITH UNMODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000;

application Ser. No. 09/960,824, entitled "METHOD AND APPARATUS FOR ENCRYPTING MEDIA PROGRAMS FOR LATER PURCHASE AND VIEWING," by Raynold M. Kahn, Gregory J. Gagnon, David D. Ha, Peter M. Klauss, Christopher P. Curren, Ronald P. Cocchi, and Thomas H. James, filed Sep. 21, 2001;

application Ser. No. 09/954,236, entitled "EMBEDDED BLACKLISTING FOR DIGITAL BROADCAST SYSTEM SECURITY," by Raynold M. Kahn, Gregory J. Gagnon, David D. Ha, and Dennis R. Flaherty, filed Sep. 14, 2001;

U.S. patent application Ser. No. 10/302,414, entitled "METHOD AND APPARATUS FOR ENSURING RECEPTION OF CONDITIONAL ACCESS INFORMATION IN MULTI-TUNER RECEIVERS," by Peter M. Klauss, Raynold M. Kahn, Gregory J. Gagnon, and David D. Ha, filed on Nov. 21, 2002;

U.S. patent application Ser. No. 10/302,416, entitled "METHOD AND APPARATUS FOR MINIMIZING CONDITIONAL ACCESS INFORMATION OVERHEAD WHILE ENSURING CONDITIONAL ACCESS INFORMATION RECEPTION IN MULTI-TUNER RECEIVERS," by Peter M. Klauss, Raynold M. Kahn, Gregory J. Gagnon, and David D. Ha, filed on Nov. 21, 2002;

PCT international Patent Application Ser. No. US02/29881, entitled "METHOD AND APPARATUS FOR CONTROLLING PAIRED OPERATION OF A CONDITIONAL ACCESS MODULE AND AN INTEGRATED RECEIVER AND DECODER," by Raynold M. Kahn and Jordan Levy, filed on Sep. 20, 2002;

U.S. patent application Ser. No. 10/758,865, entitled "DISTRIBUTION OF VIDEO CONTENT USING CLIENT TO HOST PAIRING OF INTEGRATED RECEIVERS/DECODERS," by Raynold M. Kahn, Greg Gagnon, Christopher P. Curren and Thomas H. James, filed Jan. 16, 2004; and U.S. patent application Ser. No. 10/758,811, entitled "DISTRIBUTION OF VIDEO CONTENT USING A TRUSTED NETWORK KEY FOR SHARING CONTENT," by Raynold M. Kahn, Gregory J. Gagnon, Christopher P. Curren and Thomas H. James, filed on Jan. 16, 2004.

This application is also related to the following applications:

application Ser. No. 09/590,417, entitled "METHOD AND APPARATUS FOR TRANSMITTING, RECEIVING, AND UTILIZING AUDIO/VISUAL SIGNALS AND OTHER INFORMATION", filed Jun. 08, 2000, by Arthur Tilford;

application Ser. No. 10/490,261 entitled "METHOD AND APPARATUS FOR CONTROLLING PAIRED OPERATION OF A CONDITIONAL ACCESS MODULE AND AN INTEGRATED RECEIVER AND DECODER", filed Aug. 5, 2004, by Raynold M. Kahn et al., which is a national stage entry of PCT/US02/29881 filed Sep. 20, 2002;

application Ser. No. 10/758,811 entitled "DISTRIBUTION OF VIDEO CONTENT USING A TRUSTED NETWORK KEY FOR SHARING CONTENT", filed Jan. 16, 2004, by Raynold M. Kahn et al;

application Ser. No. 10/758,818 entitled "DISTRIBUTION OF BROADCAST CONTENT FOR REMOTE DECRYPTION AND VIEWING", filed Jan. 16, 2004, by Raynold M. Kahn et al;

application Ser. No. 10/758,865 entitled "DISTRIBUTION OF VIDEO CONTENT USING CLIENT TO HOST PAIRING OF INTEGRATED RECEIVERS/DECODERS", filed Jan. 16, 2004, by Raynold M. Kahn et al;

application Ser. No. 10/759,679 entitled "VIRTUAL VIDEO ON DEMAND USING MULTIPLE ENCRYPTED VIDEO SEGMENTS", filed Jan. 19, 2004, by Robert G. Arsenault et al., which is a continuation of application Ser. No. 09/491,959, entitled "VIRTUAL VIDEO ON DEMAND USING MULTIPLE ENCRYPTED VIDEO SEGMENTS", filed Jan. 26, 2000, by Robert G. Arsenault et al., now issued Mar. 02, 2004 as U.S. Pat. No. 6,701,528;

application Ser. No. 10/790,466 entitled "VIDEO ON DEMAND IN A BROADCAST NETWORK", filed Mar. 01, 2004, by Stephen P. Dulac;

application Ser. No. 11/433,926 entitled "METHODS AND APPARATUS TO PROTECT CONTENT IN HOME NETWORKS", filed May 15, 2006, by Raynold M. Kahn;

application Ser. No. 11/433,969 entitled "METHODS AND APPARATUS TO PROVIDE CONTENT ON DEMAND IN CONTENT BROADCAST SYSTEMS", filed May 15, 2006, by Peter M. Klauss et al.;

application Ser. No. 11/434,082 entitled "CONTENT DELIVERY SYSTEMS AND METHODS TO OPERATE THE SAME", filed May 15, 2006, by Raynold M. Kahn et al.;

application Ser. No. 11/434,404 entitled "SECURE CONTENT TRANSFER SYSTEMS AND METHODS TO OPERATE THE SAME", filed May 15, 2006, by Raynold M. Kahn et al;

application Ser. No. 11/434,437 entitled "METHODS AND APPARATUS TO CONDITIONALLY AUTHORIZE CONTENT DELIVERY AT RECEIVERS IN PAY DELIVERY SYSTEMS", filed May 15, 2006, by Raynold M. Kahn et al.;

application Ser. No. 11/434,528 entitled "METHODS AND APPARATAUS TO CONDITIONALLY AUTHORIZE CONTENT DELIVERY AT BROADCAST HEADENDS IN PAY DELIVERY SYSTEMS", filed May 15, 2006, by Raynold M. Kahn et al.;

application Ser. No. 11/434,538 entitled "METHODS AND APPARATUS TO CONDITIONALLY AUTHORIZE CONTENT DELIVERY AT CONTENT SERVERS IN PAY DELIVERY SYSTEMS", filed May 15, 2006, by Raynold M. Kahn et al.;

application Ser. No. 11/499,635 entitled "DISTRIBUTED MEDIA-PROTECTION SYSTEMS AND METHODS TO OPERATE THE SAME", filed Aug. 04, 2006, by Michael Ficco;

application Ser. No. 11/499,636 entitled "DISTRIBUTED MEDIA-AGGREGATION SYSTEMS AND METHODS TO OPERATE THE SAME", filed Aug. 04, 2006, by Michael Ficco;

application Ser. No. 11/501,985 entitled "SECURE DELIVERY OF PROGRAM CONTENT VIA A REMOVAL STORAGE MEDIUM", filed Aug. 10, 2006, by Raynold M. Kahn et al.;

application Ser. No. 11/654,752 entitled "SECURE STORAGE AND REPLAY OF MEDIA PROGRAMS USING A HARD-PAIRED RECEIVER AND STORAGE DEVICE", filed Jan. 18, 2007, by Raynold M. Kahn et al., which is a continuation of application Ser. No. 09/620,833, entitled "SECURE STORAGE AND REPLAY OF MEDIA PROGRAMS USING A HARD-PAIRED RECEIVER AND STORAGE DEVICE", filed Jul. 21, 2000, by Raynold M. Kahn et al.; and application Ser. No. 11/701,800 entitled "SUPER ENCRYPTED STORAGE AND RETRIEVAL OF MEDIA PROGRAMS IN A HARD-PAIRED RECEIVER AND STORAGE DEVICE", filed Feb. 02, 2007, by Raynold M. Kahn et al., which is a continuation of application Ser. No. 09/621,476, entitled "SUPER ENCRYPTED STORAGE AND RETRIEVAL OF MEDIA PROGRAMS IN A HARD-PAIRED RECEIVER AND STORAGE DEVICE", filed Jul. 21, 2000, by Raynold M. Kahn et al., now issued Apr. 10, 2007 as U.S. Pat. No. 7,203,311.

BACKGROUND OF THE INVENTION

1. Field of the Invention

The present invention relates to systems and methods for distributing of broadcast content for remote decryption and viewing.

2. Description of the Related Art

Direct broadcast satellite (DBS) systems have become commonplace in recent years. DBS systems have been designed to ensure that only paying subscribers receive program materials transmitted by service providers. Among such systems are those which use a conditional access module (typically in the form of a smartcard) that can be removably inserted into the receiver.

One of the disadvantages of existing DBS receivers is that every television requires a separate integrated receiver/decoder (IRD) and conditional access module in order to receive unique programming. Moreover, each of the IRDs requires a tuner and conditional access module in order to receive and decrypt the programming. In addition, each of the IRDs would require a separate disk drive in order to provide digital video record (DVR) capabilities. All of these components drives up the cost of the IRDs.

Currently, there is no method of a host IRD with a conditional access module securely sharing content one or more client IRDs without a conditional access module. One of the key reasons is that the prior art provides no method for the service provider to know of and selectively enable the authorized client IRDs. As a result, service providers had no method of preventing widespread, and possible unauthorized, distribution of their program materials if several IRDs are networked together.

The present invention describes an architecture that includes a central or host IRD and one or more lightweight secondary or client IRDs coupled thereto. The present invention also describes a method of allowing the host and client IRDs to decrypt the program materials using a media encryption key and pairing keys that are shared between the IRDs in the network.

This means that the client IRDs would not require a tuner, conditional access module or disk drive, since the host IRD is responsible for the reception and storage of the program material, and the conditional access module associated with the host IRD is responsible for the reception of media encryption keys for program decryption by host and client IRDs. This allows distribution of the program materials throughout a household or other location at a significantly reduced cost as compared to other schemes, which require full IRDs for each individual subscriber.

SUMMARY OF THE INVENTION

In summary, the present invention describes a method, apparatus and article of manufacture for distributing program materials received from a direct broadcast satellite system between a host receiver and a client receiver for remote decryption.

In this invention, encrypted program materials and media encryption keys are received by the host receiver from the direct broadcast satellite system, and transferred from the host receiver to the client receiver, where the client receiver decrypts the transferred program materials using a transferred media encryption key.

For delayed viewing, the transferred program materials and media encryption keys may be stored in a large capacity storage system, such as a hard disk, at the host receiver or at a centralized home media storage subsystem, until requested for viewing by the client receiver.

The transferred program materials are protected by the broadcast encryption. The media encryption key, received from the broadcast system by the conditional access module at the host receiver, is protected for transfer to the client receiver by encryption at the host receiver using a host-client pairing key shared between host and client.

The pairing key is received from the broadcast system at both the host and client receivers, where the pairing key is decrypted at the host receiver using a receiver key uniquely associated with the host receiver and the pairing key is decrypted at the client receiver using a receiver key uniquely associated with the client receiver.

In a preferred embodiment, an encrypted version of the pairing key is received from the broadcast system at the host receiver and transferred to the client receiver, where it is decrypted using a receiver key uniquely associated with the client receiver. A differently encrypted version of the same pairing key is received from the broadcast system at the host receiver, and transferred to the conditional access module associated with the host receiver, where it is decrypted using a message decryption key uniquely associated with the conditional access module.

The conditional access module obtains the media encryption key from data received by the host receiver from the broadcast system. The conditional access module encrypts the media encryption key using the pairing key. The encrypted media encryption key is transferred from the conditional access module, via the host receiver, to the client receiver, where it is decrypted using the pairing key. The decrypted media encryption key is then used by the client receiver to decrypt program materials transferred from the host receiver.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Direct Broadcast Satellite System

Figure 1:
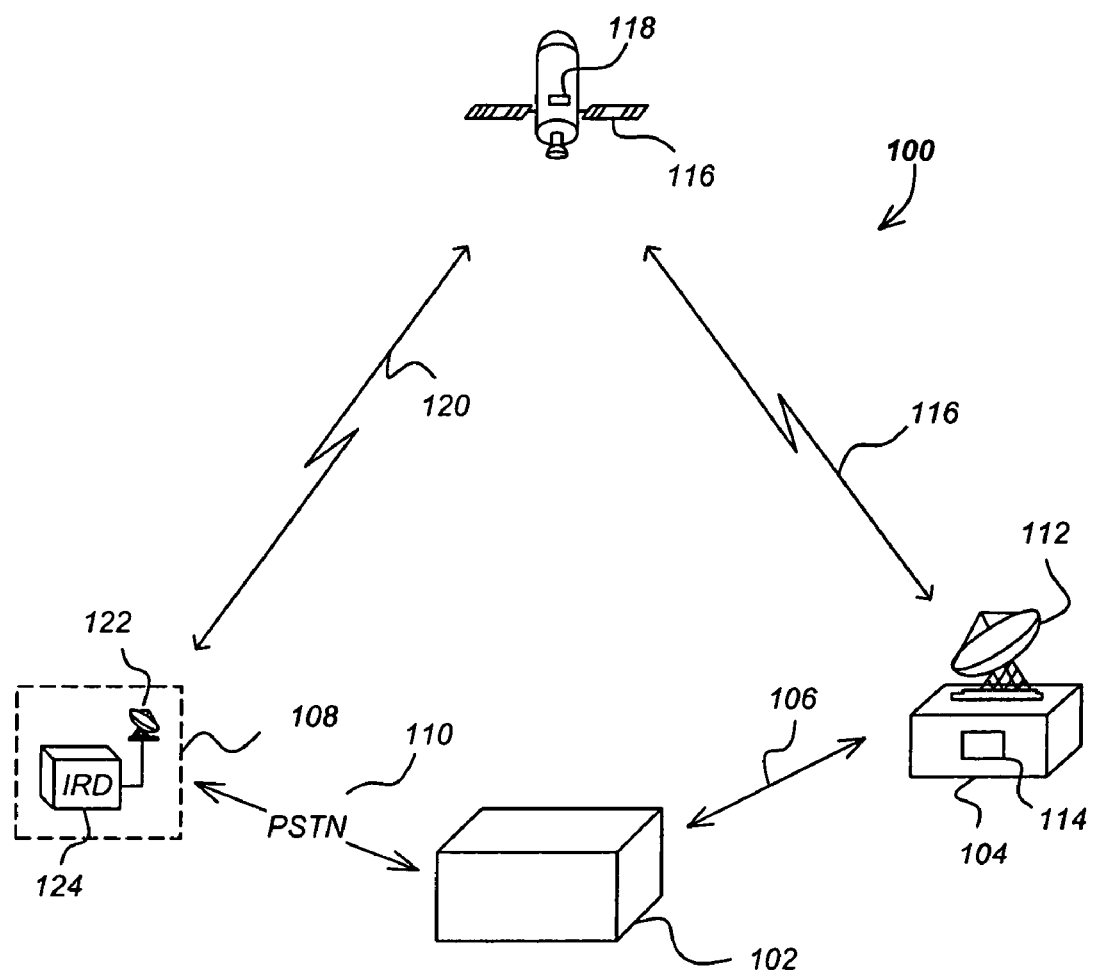
FIG. 1 is a diagram illustrating an overview of a direct broadcast satellite system according to a preferred embodiment of the present invention.

FIG. 1 is a diagram illustrating an overview of a direct broadcast satellite system 100 according to a preferred embodiment of the present invention. The system 100 includes a control center 102 operated by a service provider in communication with an uplink center 104 via a ground link 106 and with subscriber receiving stations 108 via a link 110. The control center 102 provides program materials to the uplink center 104 and coordinates with the subscriber receiving stations 108 to offer various services, including key management for encryption and decryption, pay-per-view (PPV), billing, etc.

The uplink center 104 receives the program materials from the control center 102 and, using an uplink antenna 112 and transmitter 114, transmits the program materials to one or more satellites 116, each of which may include one or more transponders 118. The satellites 116 receive and process this program material, and re-transmit the program materials to subscriber receiving stations 108 via downlink 120 using transmitter 118. Subscriber receiving stations 108 receive the program materials from the satellites 116 via an antenna 122, and decrypt and decode the program materials using an integrated receiver/decoder (IRD) 124.

Uplink Configuration

Figure 2:
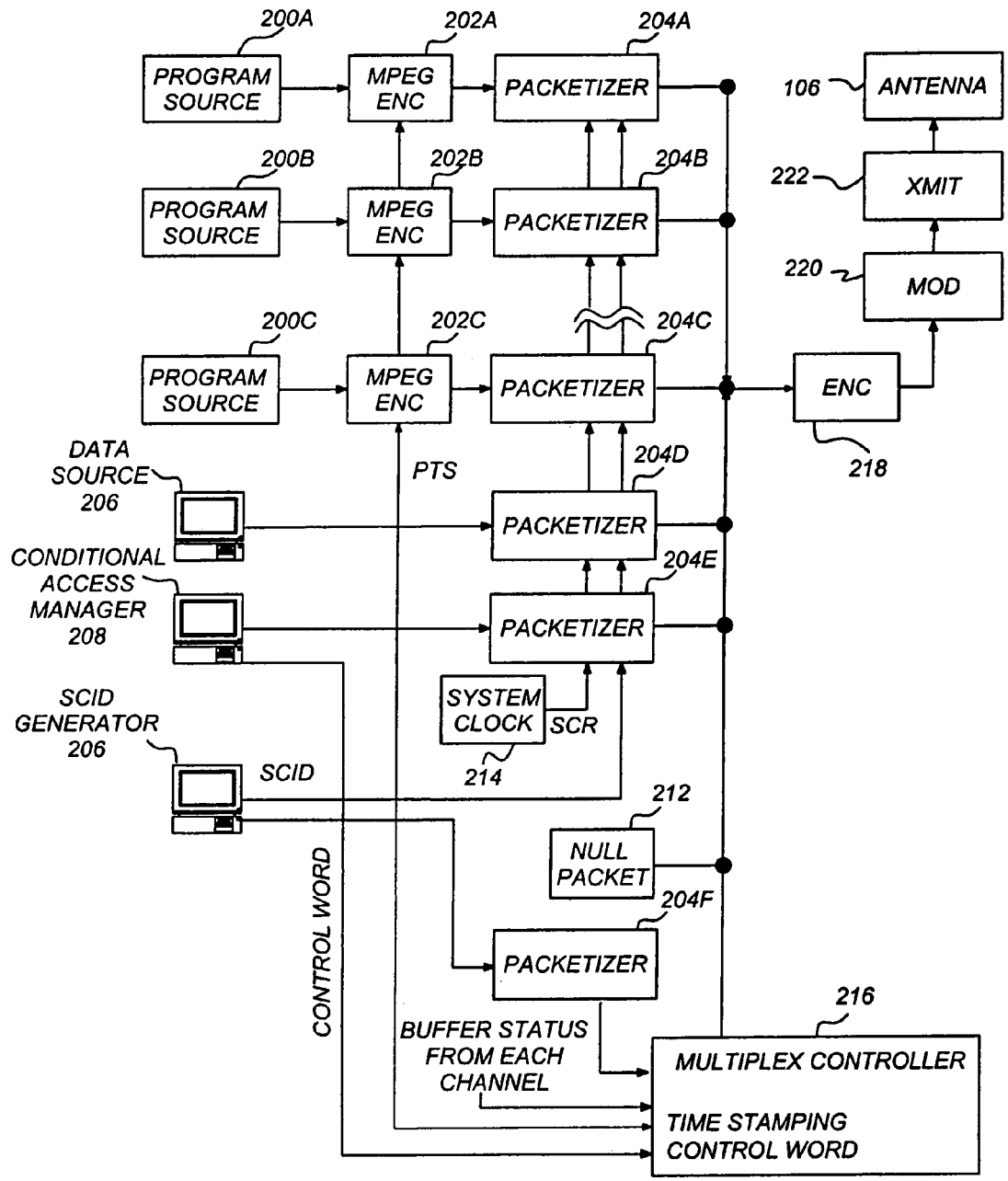
FIG. 2 is a block diagram showing a typical uplink configuration for a single satellite transponder, showing how program materials and program control information are uplinked to the satellite by the control center and the uplink center.

FIG. 2 is a block diagram showing a typical uplink center 104 configuration for a single transponder 118, showing how program materials and program control information are uplinked to the satellite 116 by the control center 102 and the uplink center 104.

One or more channels are provided by program sources 200A-200C, which may comprise one or more video channels augmented respectively with one or more audio channels.

The data from each program source 200A-200C is provided to a corresponding encoder 202A-202C, which in one embodiment comprise Motion Picture Experts Group (MPEG) encoders, although other encoders can be used as well. After encoding by the encoders 202A-202C, the output therefrom is converted into data packets by corresponding packetizers 204A-204C.

In addition to the program sources 200A-200C, data source 206 and conditional access manager 208 may provide one or more data streams for transmission by the system 100. The data from the data source 206 and conditional access manager 208 is provided to a corresponding encoder 202D-202E. After encoding by the encoders 202D-202E, the output therefrom is converted into data packets by corresponding packetizers 204D-204E.

A system channel identifier (SCID) generator 210, null packet (NP) generator 212 and system clock 214 provide control information for use in constructing a data stream for transmission by the system 100. Specifically, the packetizers 204A-204F assemble data packets using a system clock reference (SCR) from the system clock 214, a control word (CW) generated by the conditional access manager 208, and a system channel identifier (SCID) from the SCID generator 210 that associates each of the data packets that are broadcast to the subscriber with a program channel.

Each of the encoders 202A-202C also accepts a presentation time stamp (PTS) from a multiplex controller 216. The PTS is a wrap-around binary time stamp that is used to assure that the video channels are properly synchronized with the audio channels after encoding and decoding.

Finally, these data packets are then multiplexed into a serial data stream by the controller 216. The data stream is then encrypted by an encryption module 218, modulated by a modulator 220, and provided to a transmitter 222, which broadcasts the modulated data stream on a frequency bandwidth to the satellite 116 via the antenna 106.

Representative Data Stream

Figure 3A:
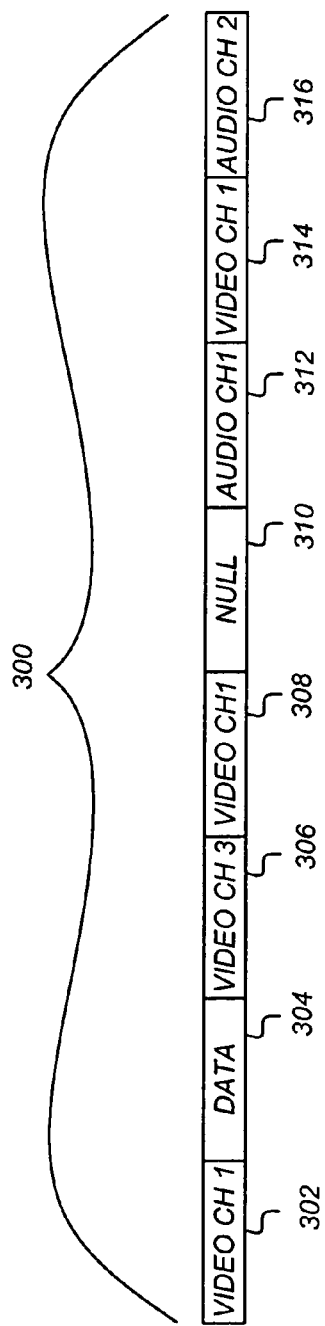
FIG. 3A is a diagram of a representative data stream according to the preferred embodiment of the present invention.

FIG. 3A is a diagram of a representative data stream 300 according to the preferred embodiment of the present invention. The first packet 302 comprises information from video channel 1 (from, for example, the first program source 200A); the second packet 304 comprises computer data information (from, for example, the computer data source 206); the third packet 306 comprises information from video channel 3 (from one of the third program source 200C); the fourth packet 308 includes information from video channel 1 (from the first program source 200A); the fifth packet 310 includes a null packet (from the NP generator 212); the sixth packet 312 includes information from audio channel 1 (from the first program source 200A); the seventh packet 314 includes information from video channel 1 (from the first program source 200A); and the eighth packet 316 includes information from video channel 2 (from the second program source 200B). The data stream therefore comprises a series of packets from any one of the program and/or data sources in an order determined by the controller 216. Using the SCID, the IRD 124 reassembles the packets to regenerate the program materials for each of the channels.

Figure 3B:
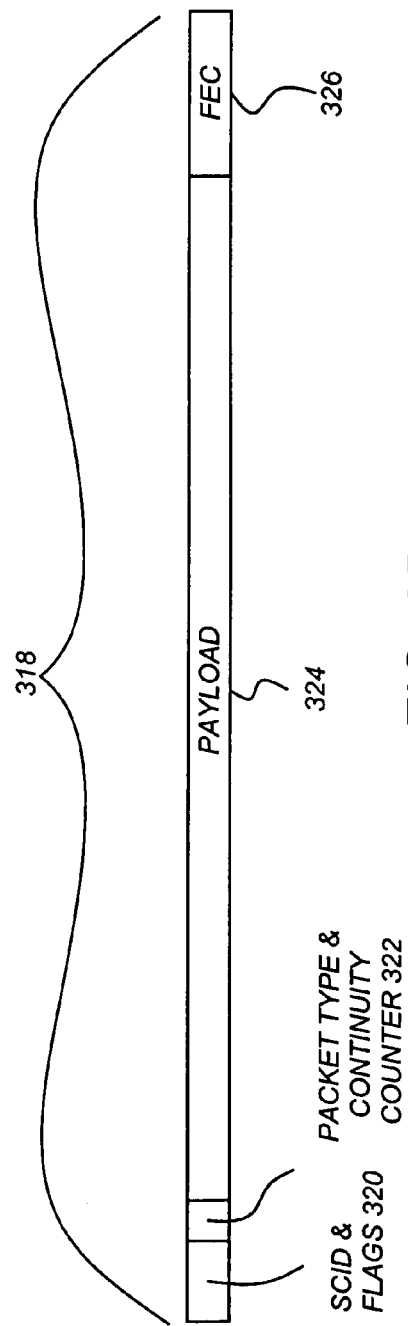
FIG. 3B is a diagram of a representative data packet according to the preferred embodiment of the present invention.

FIG. 3B is a diagram of a representative data packet 318 according to the preferred embodiment of the present invention. Each data packet segment 318 is 147 bytes long, and comprises a number of packet segments 320-326. The first segment 320 comprises two bytes of information containing the SCID and flags. The SCID is a unique 12-bit number that uniquely identifies the channel associated with the data packet 318. The flags include 4 bits that are used to control whether the data packet 318 is encrypted, and what key must be used to decrypt the data packet 318. The second segment 322 is made up of a 4-bit packet type indicator and a 4-bit continuity counter. The packet type identifies the packet as one of the four data types (video, audio, data, or null). When combined with the SCID, the packet type determines how the data packet 318 will be used. The continuity counter increments once for each packet type and SCID. The third segment 324 comprises 127 bytes of payload data. The fourth segment 326 is data required to perform forward error correction on the data packet 318.

Encryption of Program Materials

As noted above, program materials are encrypted by the encryption module 218 before transmission to ensure that they are received and viewed only by authorized IRDs 124. The program materials are encrypted according to an encryption key referred to hereinafter as a control word (CW). This can be accomplished by a variety of data encryption techniques, including symmetric algorithms, such as the data encryption standard (DES), and asymmetric algorithms, such as the Rivest-Shamir-Adleman (RSA) algorithm.

To decrypt the program material, the IRD 124 must also have access to the associated CW. To maintain security, the CW is not transmitted to the IRD 124 in plaintext. Instead, the CW is encrypted before transmission to the IRD 124. The encrypted CW is transmitted to the IRD 124 in a control word packet (CWP), i.e., a data packet type as described in FIG. 3B.

In one embodiment, the data in the CWP, including the CW, is encrypted and decrypted via what is referred to hereinafter as an input/output (I/O) indecipherable algorithm. An I/O indecipherable algorithm is an algorithm that is applied to an input data stream to produce an output data stream. Although the input data stream uniquely determines the output data stream, the algorithm selected is such that its characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 124 share the same I/O indecipherable algorithm, the IRD 124 can decode the information in the encrypted CWP to retrieve the CW. Then, using the CW, the IRD 124 can decrypt the program materials so that it can be displayed or otherwise presented.

Integrated Receiver/Decoder

Figure 4:
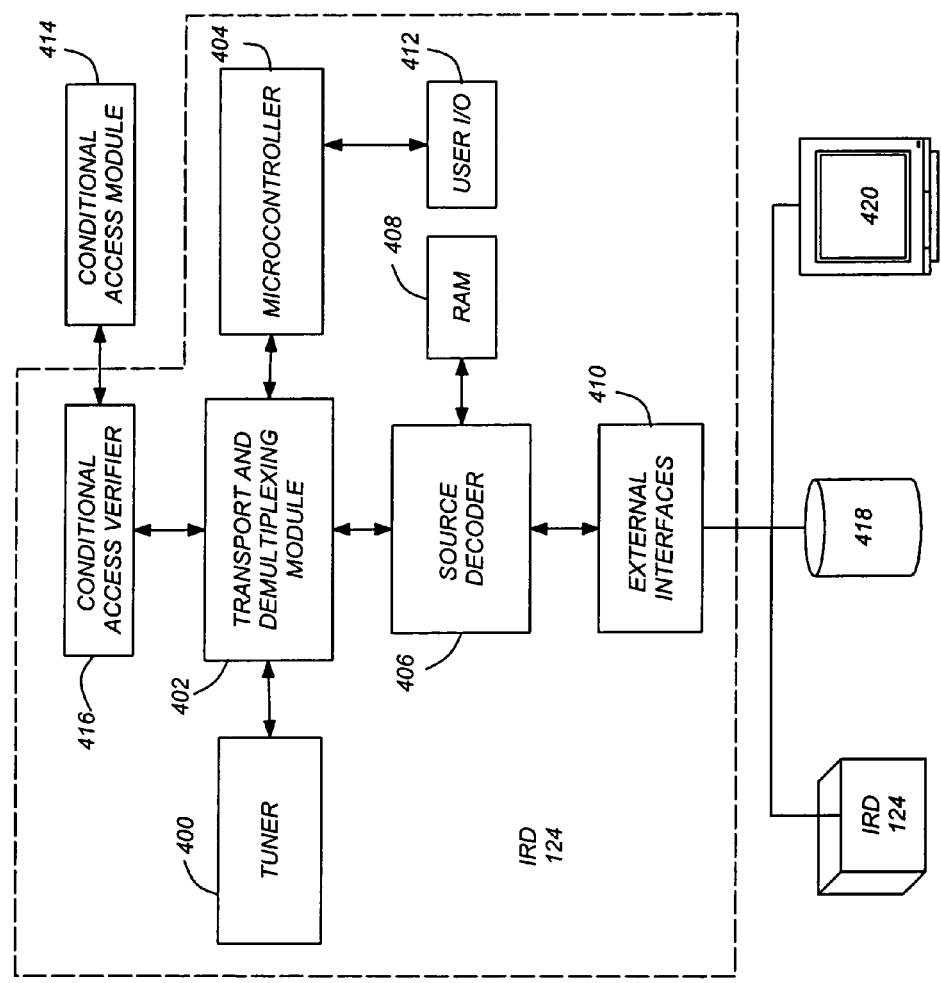
FIG. 4 is a simplified block diagram of an integrated receiver/decoder according to the preferred embodiment of the present invention.

FIG. 4 is a simplified block diagram of an IRD 124 according to the preferred embodiment of the present invention. The IRD 124 includes a tuner 400, a transport and demultiplexing module (TDM) 402 that operates under the control of a microcontroller 404 to perform transport, demultiplexing, decryption and encryption functions, a source decoder 406, random access memory (RAM) 408, external interfaces 410, user I/O 412, a conditional access module (CAM) 414, and conditional access verifier (CAV) 416.

The tuner 400 receives the data packets from the antenna 122 and provides the packets to the TDM 402. Using the SCIDs associated with the program materials, the TDM 402 and microcontroller 404 reassemble the data packets according to the channel selected by the subscriber and indicated by the user I/O 412, and decrypt the program materials using the CW.

Once the program materials have been decrypted, they are provided to the source decoder 406, which decodes the program materials according to MPEG or other standards as appropriate. The decoded program materials may be stored in the RAM 408 or provided to devices coupled to the IRD 124 via the external interfaces 410, wherein the devices coupled to the IRD 124 can include or a media storage device 418, such as a disk drive, a presentation device 420, such as a monitor, or a networked device, such as another IRD 124.

The CAM 414 is typically implemented in a smartcard or similar device, which is provided to the subscriber to be inserted into the IRD 124. The CAM 414 interfaces with the CAV 416 and the TDM 402 to verify that the IRD 124 is entitled to access the program materials.

The CW is obtained from the CWP using the CAV 416 and the CAM 414. The TDM 402 provides the CWP to the CAM 414 via the CAV 416. The CAM 414 uses an I/O indecipherable algorithm to generate the CW, which is provided back to the TDM 402. The TDM 402 then uses the CW to decrypt the program materials.

In one embodiment including a plurality of networked IRDs 124, one of the IRDs 124 is designated a "host IRD" (or host device) and each of the other IRDs are designated as a "client IRD" (or client device). In such an embodiment, the host IRD 124 includes all of the components described in FIG. 4, while the client IRDs 124 are simpler and do not include a tuner 400, CAM 414, CAV 416, disk drive 418, or other components, in order to reduce the cost of the client IRD 124. The client IRD 124 can be used to request program materials that are received or reproduced by the host IRD 124, thus allowing program materials to be reproduced at other locations in the home.

However, in this embodiment, there is no master-slave relationship, and all IRDs 124 have the capability to decrypt the program materials. Moreover, the host and client IRDs 124 share the CW by means of a pairing key (PK) that is generated by the service provider for the purposes of allowing each IRD 124 to decrypt the program materials. Consequently, this allows for the distribution of broadcast content between a host IRD 124 and one or more client IRDs 124 for remote decryption and viewing.

Operative Pairing the Host IRD and CAM

Figure 5:
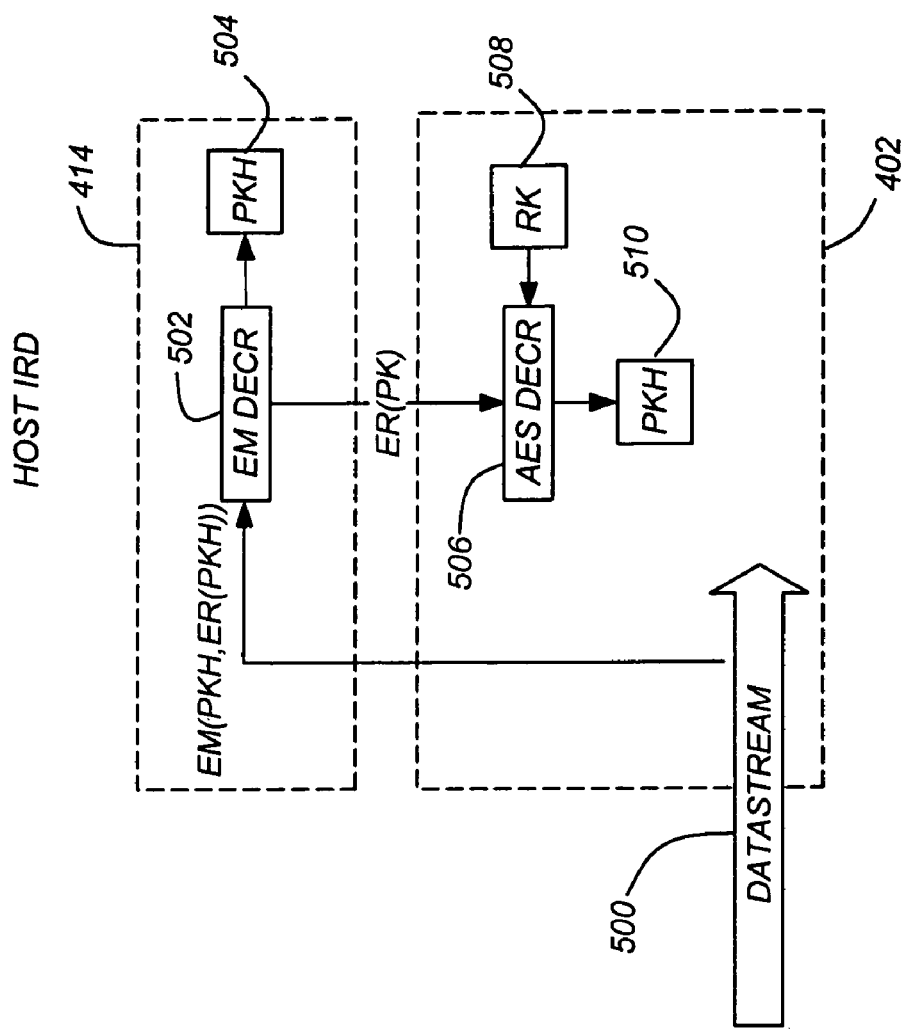
FIG. 5 is a logical flow illustrating how the host IRD and CAM are operatively paired according to the preferred embodiment of the present invention.

FIG. 5 is a logical flow illustrating how the host IRD 124 and CAM 414 are operatively paired according to the preferred embodiment of the present invention.

After the subscriber has purchased and installed the host IRD 124 and associated hardware, the subscriber supplies a unique identifier (such as a serial number) for the host IRD 124 to the service provider. The unique identifier is itself uniquely associated with a secret receiver key (RK). This association is implemented in the IRD 124 itself, and is known to the service provider. Thereafter, the service provider determines a pairing key (PK), also designated as a host pairing key PKH, that will be used to encrypt communications between the CAM 414 and the IRD 124.

The PK is then encrypted by the service provider using the RK, to produce an encrypted PK, denoted ER(PK), wherein the ER( ) indicates that RK encryption is used and the PK indicates that the PK is encrypted. A message for the CAM 414 comprising the PK and the ER(PK) is generated by the service provider, and the message is encrypted using a conditional access message encryption algorithm to produce EM(PK, ER(PK)), wherein the EM( ) indicates that conditional access message encryption is used and the PK, ER(PK) indicates that the PK, ER(PK) is encrypted.

The EM(PK, ER(PK)) is then transmitted from the service provider to the host IRD 124 where it is received by the tuner 400 and TDM 402 (500). The TDM 402 routes data packets with the encrypted message EM(PK, ER(PK)) to the CAM 414 for decryption.

In the CAM 414, the EM(PK,ER(PK)) is decrypted by a message decryption algorithm (EM DECR) 502 to produce the decrypted PK, which is stored in a secure memory 504 in the CAM 414.

The ER(PK) is provided from the CAM 414 to the TDM 402, and since it is encrypted using the RK, it is not exposed in plaintext. (In the preferred embodiment, ER(PK) is delivered to the TDM 402 via the CAM 414, but alternative embodiments might deliver ER(PK) directly to the TDM 402.)

In the TDM 402, the ER(PK) is decrypted by an Advanced Encryption Standard (AES) decryption algorithm (AES DECR) 506 using the RK 508 to produce the decrypted PK, which is then stored in a secure memory 510. This PK, now stored in both the IRD 124 and the CAM 414, is used to encrypt communications between the CAM 414 and the IRD 124, as desired.

For example, using the PK stored in 504, the CAM 414 encrypts the CW to produce EPK(CW), wherein the EPK( ) indicates that PK encryption is used and the CW indicates that the CW is encrypted. The TDM 402 decrypts the EPK(CW) received from the CAM 414 using the PK stored in 510. Since the EPK(CW) can only be decrypted by an IRD 124 that contains the appropriate PK, this cryptographically binds ("pairs") the CAM 414 and the host IRD 124.

Operatively Pairing the Host and Client IRDS

Figure 6:
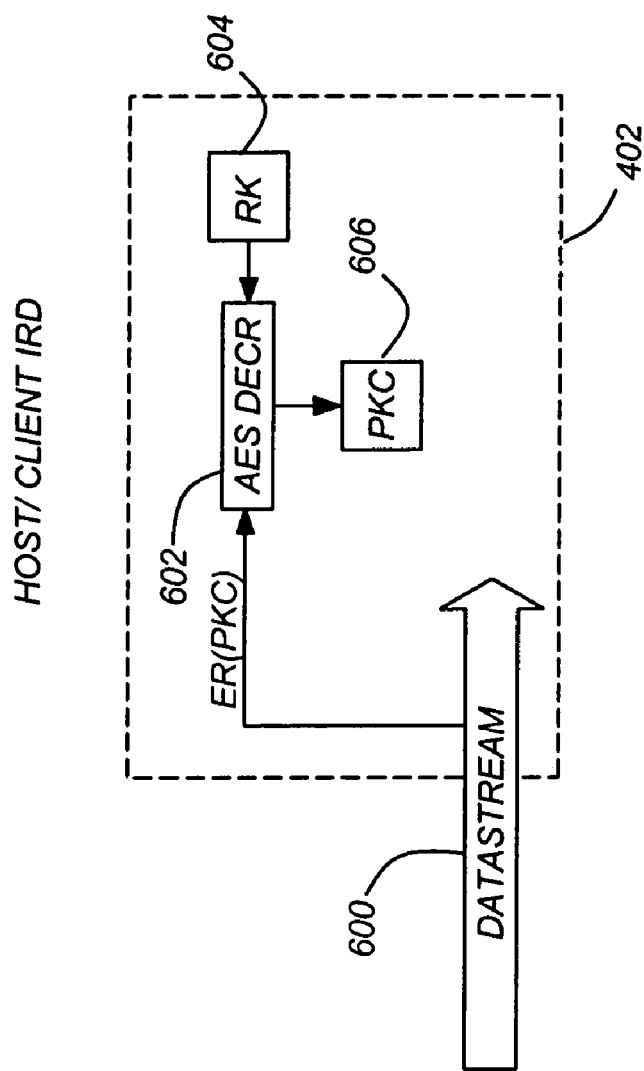
FIG. 6 is a logical flow illustrating how the host and client IRDs are operatively paired according to the preferred embodiment of the present invention.

FIG. 6 is a logical flow illustrating how the host and client IRDs 124 are operatively paired according to the preferred embodiment of the present invention.

The present invention also provides for pairing between a host IRD 124 and one or more client IRDs 124, to ensure that program materials are never shared between the host IRD 124 and client IRDs 124 in plaintext. The pairing of the host IRD 124 and client. IRDs 124 is accomplished by the use of the pairing key (PK), also designated as a client pairing key PKC.

In one embodiment, the PKC may be the same as the pairing key used to operatively pair the host IRD 124 and the CAM 414, namely the host pairing key PKH, and in such circumstances is simply designated as the pairing key PK. In another embodiment, the PKC may be different from the host pairing key PKH used to operatively pair the host IRD 124 and the CAM 414. Both embodiments are described in more detail below.

As noted above, the subscriber supplies a unique identifier (such as a serial number) for the host IRD 124 to the service provider, wherein the unique identifier is associated with a secret receiver key (RK), wherein the association is implemented in the IRD 124 itself and is known to the service provider.

After activating the host IRD 124, the subscriber can request the activation of additional client IRDs 124 using the same method. Consequently, the service provider would determine the RK for each of the client IRDs 124 as well.

Thereafter, the service provider establishes the PKC for a particular combination of host and client IRDs 124. Preferably, the service provider encrypts the PKC, using an Advanced Encryption Standard (AES) encryption algorithm, with RKH, the RK of the host IRD 124, and RKC, the RK of the client IRD 124, thereby creating two ER(PKC) messages containing the encrypted PKC, i.e., ERH(PKC) for the host IRD 124 and ERC(PKC) for the client IRD 124.

The service provider transmits one or more messages to the host IRD 124, as represented by 600, using an ID for the CAM 414 of the host IRD 124 for over-the-air addressing of the message, and specifying both a Host ID (HID) and a Client ID (CLID), wherein the CLID identifies the client IRDs 124 to the host IRD 124. These messages contain the encrypted PKC, and are then stored on disk drive 418 or other non-volatile memory in the host IRD 124.

Any number of such encrypted versions of the PKC can be stored in the host IRD 124. For example, there may be a different PKC for each pairing of a client IRD 124 networked with the host IRD 124. On the other hand, a host IRD 124 may share the same PKC with all the client IRDs 124. Moreover, the PKC shared with all the client IRDs 124 may itself be the PKH.

Preferably, the host IRD 124 receives both of the ERH (PKC) and ERC(PKC) messages off-air and, at some later time, the ERC(PKC) for the client IRD 124 is obtained by the client IRD 124 from the host IRD 124. This may occur, for example, when a client IRD 124 is activated or powered up.

In the host and client IRDs 124, the ER(PKC) (which is either the ERH(PKC) or ERC(PKC)) is decrypted by an AES decryption algorithm (AES DECR) 602 in the TDM 402 using the appropriate RK 604 (which is either the RKH or RKC), and the decrypted PKC is stored in a secure memory 606 in the host and client IRDs 124.

Consequently, the service provider, through the assignment of the PKC, establishes a pairing relationship between the host IRD 124 and one or more client IRDs 124 forming a network, so that the program materials are shared in secure manner within the network.

Sharing Program Materials Between Host and Client IRDS

Figure 7A:
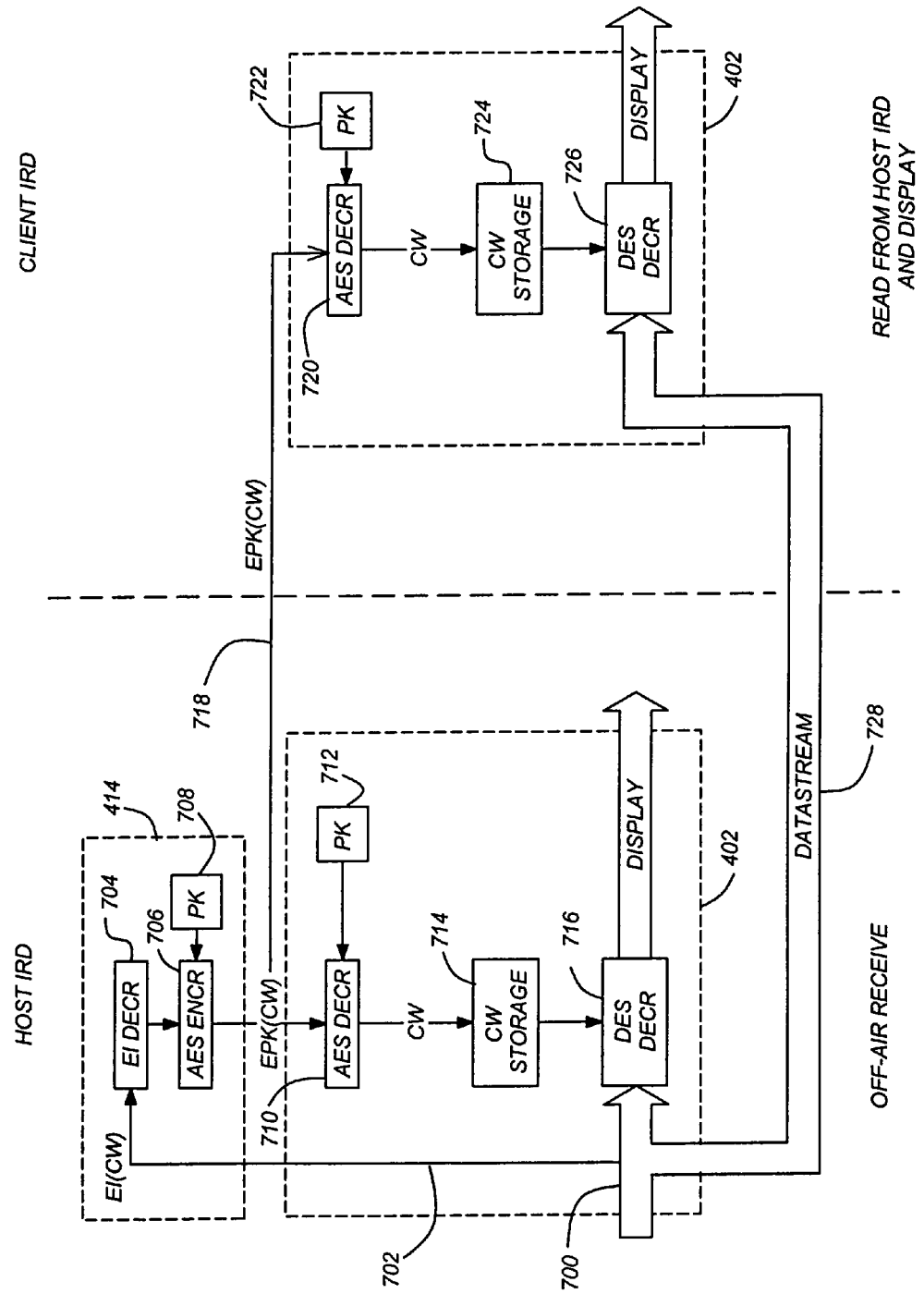
FIGS. 7A and 7B are logical flows illustrating how the program materials may be shared between host and client IRDs according to alternative embodiments of the present invention.
Figure 7B:
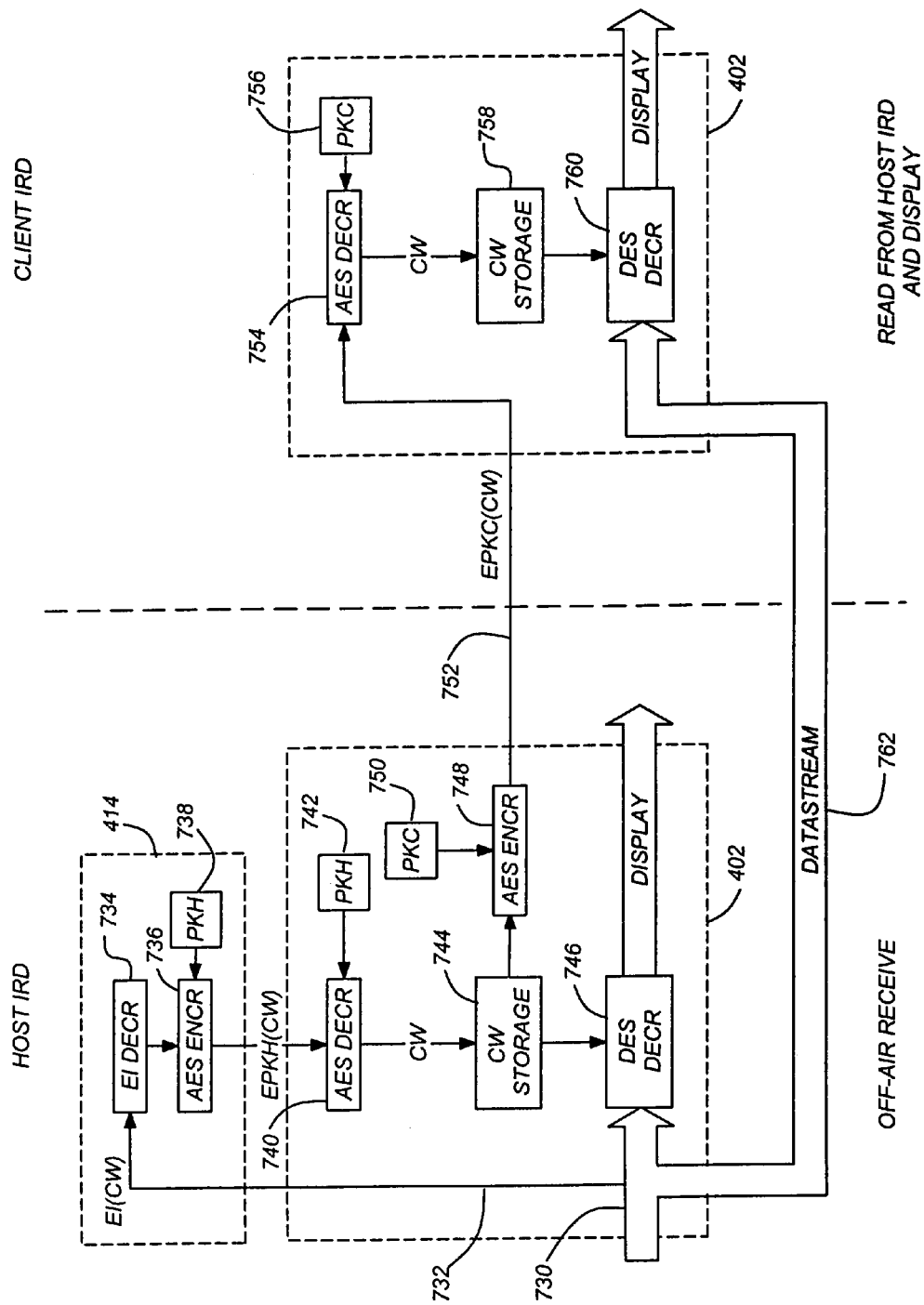

FIGS. 7A and 7B are logical flows illustrating how the program materials may be shared between host and client IRDs 124 according to alternative embodiments of the present invention.

In the preferred embodiment of FIG. 7A, the host pairing key PKH and the client pairing key PKC are the same. Consequently, the host and client pairing keys are designated as PK in the figure.

In the portion of FIG. 7A labeled "Off-Air Receive," the host IRD 124 receives a data stream 700 including the program materials encrypted by the media encryption key CW, as well as the encrypted media encryption key EI(CW) 702 itself. The EI(CW) is provided, via the TDM 402, to the CAM 414, where it is decrypted by an I/O indecipherable decryption algorithm (EI DECR) 704. The result is the unencrypted media encryption key CW.

The unencrypted CW is then re-encrypted by the CAM 414 using an AES encryption algorithm (AES ENCR) 706 with the PK 708 stored in the CAM 414 to produce a re-encrypted media encryption key EPK(CW).

The re-encrypted media encryption key EPK(CW) is provided to the TDM 402, where it is decrypted by an AES decryption algorithm (AES DECR) 710 using the PK 712 stored in the TDM 402, in order to obtain the unencrypted media encryption key CW.

The unencrypted CW is then stored in a CW storage 714, and used when necessary by a Data Encryption Standard (DES) decryption algorithm (DES DECR) 716 to decrypt the program material, so that the decrypted program materials can be displayed on a monitor 420, stored on a disk drive 418, etc.

The re-encrypted media encryption key EPK(CW) is also transmitted via 718 from the host IRD 124 to the client IRD 124. Since the program materials are encrypted with the CW, the client IRD 124 must be able to receive the CW from the host IRD 124 in a secure manner.

In the portion of FIG. 7A labeled "Read from Host IRD and Display," the client IRD 124 receives 718 the EPK(CW) from the host IRD 124, which is then decrypted by an AES decryption algorithm (AES DECR) 720 using the PK 722. As noted above, the client IRD 124 had previously been provided the PK 722 by the service provider.

After the CW is decrypted by the AES decryption algorithm 720, the CW is then stored in the CW storage 724 of the TDM 402 in the client IRD 124. Thereafter, the CW is retrieved from the CW storage 724 for use in decrypting the encrypted program materials by a DES decryption algorithm (DES DECR) 726, wherein the program materials are transferred 728 from the host IRD 124 to the client IRD 124 without being decrypted at the host IRD 124. The client IRD 124 can then display the decrypted program materials on a presentation device 420 coupled to the client IRD 124.

In an alternative embodiment of FIG. 7A, the host pairing key PKH and the client pairing key PKC are different (notwithstanding the fact that the host and client pairing keys are designated as PK in the figure), and both the host pairing key PKH and the client pairing key PKC are delivered to the CAM 414 in the manner shown in FIG. 5. As a result, the CAM 414 encrypts the CW in accordance with the IRD 124 that requires that CW for program decryption, i.e., EPK(CW) is either EPKH(CW) or EPKH(CW). Moreover, the host and client IRDs 124 do not have simultaneous access to the same program materials, unless the CAM 414 separately encrypts EPKH(CW) and EPKC(CW) and delivers them to the host and client IRDs 124, respectively. Note that with multiple clients IRDs 124, the CAM 414 may need to store multiple pairing keys, or alternatively, the EM(PKH) and multiple EM(PKC) values, received from the broadcast datastream 730, may be stored in the disk drive 418 or other non-volatile memory of the host IRD 124, and then selectively loaded into the CAM 414.

In the embodiment of FIG. 7B, the host pairing key PKH and the client pairing key PKC are also different. Consequently, the host pairing key is designated as PKH in the figure and the client pairing key is designated as PKC in the figure.

In the portion of FIG. 7B labeled "Off-Air Receive," the host IRD 124 receives a data stream 730 including the program materials encrypted by the media encryption key CW, as well as the encrypted media encryption key EI(CW) 732 itself. The EI(CW) is provided, via the TDM 402, to the CAM 414, where it is decrypted by an I/O indecipherable decryption algorithm (EI DECR) 734. The result is the unencrypted media encryption key CW.

The unencrypted CW is then re-encrypted by the CAM 414 by an AES encryption algorithm (AES ENCR) 736 using the PK of the host IRD 124 stored in the CAM 414, which is designated PKH 738, to produce a re-encrypted media encryption key EPKH(CW).

The re-encrypted media encryption key EPKH(CW) is provided to the TDM 402 in the host IRD 124, where it is decrypted by an AES decryption algorithm (AES DECR) 740 using the PK of the host IRD 124 stored in the TDM 402, which is designated PKH 742, in order to obtain the unencrypted media encryption key CW. The unencrypted CW is then stored in a CW storage 744, and used when necessary by a DES decryption algorithm (DES DECR) 746 to decrypt the program material, so that the program materials can be displayed on a monitor 420, stored on a disk drive 418, etc.

Since the program materials are encrypted with the CW, the client IRD 124 must be able to receive the CW from the host IRD 124 in a secure manner. To accomplish this task, the CW is encrypted in the host IRD 124 by an AES encryption algorithm (AES ENCR) 748 using the PK of the client IRD 124 also stored in the TDM 402, which is designated PKC 750, to produce an EPKC(CW).

In the portion of FIG. 7B labeled "Read from Host IRD and Display," the client IRD 124 receives the EPKC(CW) from the host IRD 124 752, which is then decrypted by an AES decryption algorithm (AES DECR) 754 using the PK of the client IRD 124, which is designated PKC 756. As noted above, the client IRD 124 had been previously been provided the PKC 756 by the service provider.

After the CW is decrypted by the AES decryption algorithm 754, the CW is then stored in the CW storage 758 of the TDM 402 in the client IRD 124. Thereafter, the CW is retrieved from the CW storage 758 of the TDM 402 for use in decrypting the program materials by a DES decryption algorithm (DES DECR) 760, wherein the program materials are transferred in a datastream 762 from the host IRD 124 to the client IRD 124 without being decrypted. The client IRD 124 can then display the decrypted program materials on a presentation device 420 coupled to the client IRD 124.

In the above embodiments, the program materials received by the host IRD 124 are simply relayed to the client IRD 124, with minimal processing by the host IRD 124. The program materials are only encrypted once, by the service provider, and are delivered to the client IRD 124 only in encrypted form, together with the CW necessary to decrypt the program materials.

It should be noted that the datastream received by the host IRD 124 generally includes a number of multiplexed program materials from a number of program sources. In some embodiments, the received datastream is forwarded to the client IRD 124, and the client TDM 402 extracts the packets according to the desired program materials, before decryption. In other embodiments, the TDM 402 of the host IRD 124 may fully or partially extract the desired program materials from the received datastream, to reduce the transmission data-rate of the datastream transferred from the host IRD 124 to the client IRD 124.

It should also be noted that the above description applies for immediate viewing as well as for delayed viewing of the program materials by the client IRD 124. For delayed viewing, the transferred datastream and encrypted media encryption keys or re-encrypted media encryption keys may be stored in a large capacity storage system, such as a disk drive 418, at the host IRD 124, or at a centralized home media storage subsystem 418, and then forwarded to the client IRD 124 when requested for viewing. For example, the transferred datastream and encrypted media encryption keys may be stored on the disk drive 418 until the program materials are requested, at which point the encrypted media encryption keys are decrypted by the CAM 414 and re-encrypted for delivery to the client IRD 124, as well as stored on the disk drive 418 for future use or replaying of the program materials by the host or client IRDs 124.

In these embodiments, no CAM 414 is required on the client IRD 124, since the client IRD 124 obtains the CW necessary for decrypting the program materials from the host IRD 124 in a secure manner. Also, since the client IRD 124 does not need to receive program materials from an off-air signal, no tuner is required in the client IRD 124. Finally, no disk drive 418 is required in the client IRD 124, since client IRDs 124 may use the disk drive 418 of the host IRD 124 as a "virtual" disk. All of this leads to greatly reduced cost of the client IRDs 124.

On the other hand, because of the need to secure the program materials when they are transmitted over the network, the client IRD 124 requires certain decryption circuitry and secure key storage, which will generally be included in a single integrated circuit. Since similar circuitry is used in the host IRD 124, it is cost effective to produce and personalize a standard integrated circuit that will be used in host and client IRDs 124, rather than different integrated circuits for each type of IRD 124. In this case, the client IRD 124 may cost effectively contain the circuitry that performs the decryption, decoding and/or demultiplexing of the program materials. Rather than burden the host IRD 124 with the role of performing these functions for all client IRDs 124, which may lead to a bottleneck in the host IRD 124, the client IRD 124 performs these functions in the present invention. This architecture enables a host IRD 124 to support a larger number of client IRDs 124.

Note that one of the advantages to the embodiments having different values of PKH and PKC is that it allows the service provider and host IRD 124 to control which of the client IRDs 124 receives the program materials. This could be an advantage if the service provider wishes to have several tiers of services for the client IRDs 124. This could also allow subscribers to selectively control which program materials are distributed to which client IRD 124 if limits, either rating or spending, are to be set. Also, if a client IRD 124 is suspected of not being in the location indicated or is being used for pirating purposes, the distribution of program materials to that client IRD 124 could be terminated without disrupting services to other client IRDs 124 in the network. The disadvantage of this system would be the number of keys that would be required for each pairing and the bookkeeping of all of these keys. Both of these issues are not serious and could be overcome by careful system planning, if necessary. However, in most applications, the simpler embodiment of FIG. 7A is preferred, having the same value of PKH and PKC for the host and clients IRDs 124 in the same home network.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

For example, while the foregoing disclosure presents an embodiment of the present invention as it is applied to a direct broadcast satellite system, the present invention can be applied to any system that uses encryption. Moreover, although the present invention is described in terms of specific encryption and decryption schemes, it could also be applied to other encryption and decryption schemes, or to different uses of the specific encryption and decryption schemes. Finally, although specific hardware, software and logic is described herein, those skilled in the art will recognize that other hardware, software or logic may accomplish the same result, without departing from the scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of distributing program materials received from a broadcast system between a host receiver and a client receiver for remote decryption, comprising:
    (a) receiving an encrypted media encryption key at the host receiver;
    (b) decrypting the encrypted media encryption key at the host receiver;
    (c) re-encrypting the decrypted media encryption key at the host receiver using a pairing key;
    (d) transferring the re-encrypted media encryption key from the host receiver to the client receiver, wherein the client receiver does not utilize a conditional access module (CAM);
    (e) decrypting the re-encrypted media encryption key at the client receiver using the pairing key;
    (f) receiving encrypted program materials from the broadcast system at the host receiver;
    (g) transferring the encrypted program materials from the host receiver to the client receiver; and
    (h) decrypting the encrypted program materials at the client receiver using the decrypted media encryption key.

2. The method of claim 1, further comprising decrypting the encrypted program materials at the host receiver using the decrypted media encryption key.

3. The method of claim 1, further comprising receiving the pairing key from the broadcast system at both the host receiver and the client receiver.

4. The method of claim 3, wherein the receiving step comprises:

receiving the pairing key from the broadcast system at the host receiver, wherein the pairing key is encrypted; and decrypting the pairing key at the host receiver using a receiver key uniquely associated with the host receiver.

5. The method of claim 3, wherein the receiving step comprises:

receiving the pairing key at the client receiver, wherein the pairing key is encrypted; and decrypting the pairing key at the client receiver using a receiver key uniquely associated with the client receiver.

6. The method of claim 5, further comprising:

receiving the pairing key from the broadcast system at the host receiver; and transferring the pairing key from the host receiver to the client receiver.

7. An apparatus for distributing program materials received from a broadcast system between a host receiver and a client receiver for remote decryption, comprising:

(a) means for receiving an encrypted media encryption key at the host receiver;

(b) means for decrypting the encrypted media encryption key at the host receiver;

(c) means for re-encrypting the decrypted media encryption key at the host receiver using a pairing key;

(d) means for transferring the re-encrypted media encryption key from the host receiver to the client receiver, wherein the client receiver does not utilize a conditional access module (CAM);

(e) means for decrypting the re-encrypted media encryption key at the client receiver using the pairing key;

(f) means for receiving encrypted program materials from the broadcast system at the host receiver;

(g) means for transferring the encrypted program materials from the host receiver to the client receiver; and (h) means for decrypting the encrypted program materials at the client receiver using the decrypted media encryption key.

8. The apparatus of claim 7, further comprising means for decrypting the encrypted program materials at the host receiver using the decrypted media encryption key.

9. The apparatus of claim 7, further comprising means for receiving the pairing key from the broadcast system at both the host receiver and the client receiver.

10. The apparatus of claim 9, wherein the means for receiving comprises:

means for receiving the pairing key from the broadcast system at the host receiver, wherein the pairing key is encrypted; and means for decrypting the pairing key at the host receiver using a receiver key uniquely associated with the host receiver.

11. The apparatus of claim 9, wherein the means for receiving comprises:

means for receiving the pairing key at the client receiver, wherein the pairing key is encrypted; and means for decrypting the pairing key at the client receiver using a receiver key uniquely associated with the client receiver.

12. The apparatus of claim 11, further comprising:

means for receiving the pairing key from the broadcast system at the host receiver; and means for transferring the pairing key from the host receiver to the client receiver.

13. A method of distributing program materials received from a broadcast system between a host receiver and a client receiver for remote decryption, comprising:

(a) receiving an encrypted media encryption key at a conditional access module associated with the host receiver;

(b) decrypting the encrypted media encryption key at the conditional access module;

(c) re-encrypting the decrypted media encryption key at the conditional access module using a first pairing key shared between the conditional access module and the host receiver;

(d) transferring the re-encrypted media encryption key from the conditional access module to the host receiver;

(e) receiving the re-encrypted media encryption key at the host receiver from the conditional access module;

(f) decrypting the re-encrypted media encryption key at the host receiver using the first pairing key shared between the conditional access module and host receiver;

(g) re-encrypting the decrypted media encryption key at the host receiver using a second pairing key shared between the host receiver and the client receiver, wherein the client receiver does not utilize a conditional access module (CAM);

(h) transferring the re-encrypted media encryption key from the host receiver to the client receiver; and (i) decrypting the re-encrypted media encryption key at the client receiver using the second pairing key shared between the host receiver and the client receiver;

(j) receiving encrypted program materials from the broadcast system at the host receiver;

(k) transferring encrypted program materials from the host receiver to the client receiver; and (l) decrypting the encrypted program materials at the client receiver using the decrypted media encryption key.

14. The method of claim 13, further comprising decrypting the encrypted program materials received from the broadcast system at the host receiver using the decrypted media encryption key.

15. The method of claim 13, further comprising receiving the first pairing key from the broadcast system at both the host receiver and the conditional access module.

16. The method of claim 15, wherein the receiving step comprises:

receiving the first pairing key from the broadcast system at the host receiver, wherein the first pairing key is encrypted; and decrypting the first pairing key at the host receiver using a receiver key uniquely associated with the host receiver.

17. The method of claim 15, wherein the receiving step comprises:

receiving the first pairing key from the broadcast system at the conditional access module; and decrypting the first pairing key at the conditional access module.

18. The method of claim 13, further comprising receiving the second pairing key from the broadcast system at both the host receiver and the client receiver.

19. The method of claim 18, wherein the receiving step comprises:

receiving the second pairing key from the broadcast system at the host receiver, wherein the second pairing key is encrypted; and decrypting the second pairing key at the host receiver using a receiver key uniquely associated with the host receiver.

20. The method of claim 18, wherein the receiving step comprises:

receiving the second pairing key at the client receiver, wherein the second pairing key is encrypted; and decrypting the second pairing key at the client receiver using a receiver key uniquely associated with the client receiver.

21. The method of claim 20, further comprising:

receiving the second pairing key from the broadcast system at the host receiver; and transferring the second pairing key from the host receiver to the client receiver.

22. An apparatus for distributing program materials received from a broadcast system between a host receiver and a client receiver for remote decryption, comprising:
- (a) means for receiving an encrypted media encryption key at a conditional access module associated with the host receiver;
- (b) means for decrypting the encrypted media encryption key at the conditional access module;
- (c) means for re-encrypting the decrypted media encryption key at the conditional access module using a first pairing key shared between the conditional access module and the host receiver;
- (d) means for transferring the re-encrypted media encryption key from the conditional access module to the host receiver;
- (e) means for receiving the re-encrypted media encryption key at the host receiver from the conditional access module;
- (f) means for decrypting the re-encrypted media encryption key at the host receiver using the first pairing key shared between the conditional access module and host receiver;
- (g) means for re-encrypting the decrypted media encryption key at the host receiver using a second pairing key shared between the host receiver and the client receiver, wherein the client receiver does not utilize a conditional access module (CAM);
- (h) means for transferring the re-encrypted media encryption key from the host receiver to the client receiver; and
- (i) means for decrypting the re-encrypted media encryption key at the client receiver using the second pairing key shared between the host receiver and the client receiver;
- (j) means for receiving encrypted program materials from the broadcast system at the host receiver;
- (k) means for transferring encrypted program materials from the host receiver to the client receiver; and
- (l) means for decrypting the encrypted program materials at the client receiver using the decrypted media encryption key.

23. The apparatus of claim 22, further comprising means for decrypting the encrypted program materials received from the broadcast system at the host receiver using the decrypted media encryption key.

24. The apparatus of claim 22, further comprising means for receiving the first pairing key from the broadcast system at both the host receiver and the conditional access module.

25. The apparatus of claim 24, wherein the means for receiving comprises:
means for receiving the first pairing key from the broadcast system at the host receiver, wherein the first pairing key is encrypted; and
means for decrypting the first pairing key at the host receiver using a receiver key uniquely associated with the host receiver.

26. The apparatus of claim 24, wherein the means for receiving comprises:
means for receiving the first pairing key from the broadcast system at the conditional access module; and
means for decrypting the first pairing key at the conditional access module.

27. The apparatus of claim 22, further comprising means for receiving the second pairing key from the broadcast system at both the host receiver and the client receiver.

28. The apparatus of claim 27, wherein the means for receiving comprises:
means for receiving the second pairing key from the broadcast system at the host receiver, wherein the second pairing key is encrypted; and
means for decrypting the second pairing key at the host receiver using a receiver key uniquely associated with the host receiver.

29. The apparatus of claim 27, wherein the means for receiving comprises:
means for receiving the second pairing key at the client receiver, wherein the second pairing key is encrypted; and
means for decrypting the second pairing key at the client receiver using a receiver key uniquely associated with the client receiver.

30. The apparatus of claim 29, further comprising:
means for receiving the second pairing key from the broadcast system at the host receiver; and
means for transferring the second pairing key from the host receiver to the client receiver.

31. A method of distributing program materials received from a broadcast system between a host and client receiver for remote decryption, comprising:
- (a) receiving an encrypted media encryption key at a conditional access module associated with the host receiver;
- (b) decrypting the encrypted media encryption key at the conditional access module;
- (c) re-encrypting the decrypted media encryption key at the conditional access module using a pairing key shared between the conditional access module and the client receiver, wherein the client receiver does not utilize a conditional access module (CAM);
- (d) transferring the re-encrypted media encryption key from the conditional access module to the client receiver;
- (e) decrypting the re-encrypted media encryption key at the client receiver using the pairing key shared between the conditional access module and client receiver;
- (f) receiving encrypted program materials from the broadcast system at the host receiver;
- (g) transferring encrypted program materials from the host receiver to the client receiver; and
- (h) decrypting the encrypted program materials at the client receiver using the decrypted media encryption key.

32. The method of claim 31, further comprising receiving the pairing key from the broadcast system at both the conditional access module and the client receiver.

33. The method of claim 32, wherein the receiving step comprises:
receiving the pairing key from the broadcast system at the conditional access module, wherein the pairing key is encrypted; and
decrypting the pairing key at the conditional access module.

34. The method of claim 32, wherein the receiving step comprises:
receiving the pairing key at the client receiver, wherein the pairing key is encrypted; and
decrypting the pairing key at the client receiver using a receiver key uniquely associated with the client receiver.

35. The method of claim 34, further comprising:
receiving the pairing key at the conditional access module; and
transferring the pairing key from the conditional access module to the client receiver.

36. The method of claim 31, wherein the transferring step comprises:
transferring the re-encrypted media encryption key from the conditional access module to the host receiver;
receiving the re-encrypted media encryption key from the conditional access module at the host receiver; and
transferring the re-encrypted media encrypted key from the host receiver to the client receiver.

37. The method of claim 36, further comprising
decrypting the re-encrypted media encryption key at the host receiver using a pairing key shared between the conditional access module and the host receiver, wherein the pairing key shared between the conditional access module and the host receiver is the same as the pairing key shared between the conditional access module and the client receiver; and
decrypting the encrypted program materials at the host receiver using the decrypted media encryption key.

38. An apparatus for distributing program materials received from a broadcast system between a host and client receiver for remote decryption, comprising:
(a) means for receiving an encrypted media encryption key at a conditional access module associated with the host receiver;
(b) means for decrypting the encrypted media encryption key at the conditional access module;
(c) means for re-encrypting the decrypted media encryption key at the conditional access module using a pairing key shared between the conditional access module and the client receiver, wherein the client receiver does not utilize a conditional access module (CAM);
(d) means for transferring the re-encrypted media encryption key from the conditional access module to the client receiver;
(e) means for decrypting the re-encrypted media encryption key at the client receiver using the pairing key shared between the conditional access module and client receiver;
(f) means for receiving encrypted program materials from the broadcast system at the host receiver;
(g) means for transferring encrypted program materials from the host receiver to the client receiver; and
(h) means for decrypting the encrypted program materials at the client receiver using the decrypted media encryption key.

39. The apparatus of claim 38, further comprising means for receiving the pairing key from the broadcast system at both the conditional access module and the client receiver.

40. The apparatus of claim 39, wherein the means for receiving comprises:
means for receiving the pairing key from the broadcast system at the conditional access module, wherein the pairing key is encrypted; and
means for decrypting the pairing key at the conditional access module.

41. The apparatus of claim 39, wherein the means for receiving comprises:
means for receiving the pairing key at the client receiver, wherein the pairing key is encrypted; and
means for decrypting the pairing key at the client receiver using a receiver key uniquely associated with the client receiver.

42. The apparatus of claim 41, further comprising:
means for receiving the pairing key at the conditional access module; and
means for transferring the pairing key from the conditional access module to the client receiver.

43. The apparatus of claim 38, wherein the means for transferring comprises:
means for transferring the re-encrypted media encryption key from the conditional access module to the host receiver;
means for receiving the re-encrypted media encryption key from the conditional access module at the host receiver; and
means for transferring the re-encrypted media encrypted key from the host receiver to the client receiver.

44. The apparatus of claim 43, further comprising
means for decrypting the re-encrypted media encryption key at the host receiver using a pairing key shared between the conditional access module and the host receiver, wherein the pairing key shared between the conditional access module and the host receiver is the same as the pairing key shared between the conditional access module and the client receiver; and
means for decrypting the encrypted program materials at the host receiver using the decrypted media encryption key.

45. The method of claim 1 wherein the client receiver does not comprise a tuner.

46. The apparatus of claim 7 wherein the client receiver does not comprise a tuner.

47. The method of claim 45 wherein the host receiver utilizes a conditional access module (CAM).

48. The apparatus of claim 46 wherein the host receiver utilizes a conditional access module (CAM).

* * * * *